US 6,605,918 B2

(12) United States Patent
Mayhew et al.

(10) Patent No.: US 6,605,918 B2
(45) Date of Patent: Aug. 12, 2003

(54) SYSTEM AND METHOD FOR COMPENSATING THE READING OF NONCONTINUOUS AC SINUSOIDAL CURRENTS

(75) Inventors: Scott Mayhew, North Aurora, IL (US); Scott Wakefield, Plano, IL (US); Daniel Zuzuly, Geneva, IL (US)

(73) Assignee: Siemens Energy & Automation, Alpharetta, GA (US)

( * ) Notice: Subject to any disclaimer, the term of this patent is extended or adjusted under 35 U.S.C. 154(b) by 0 days.

(21) Appl. No.: 09/943,809

(22) Filed: Aug. 31, 2001

(65) Prior Publication Data

US 2003/0042865 A1 Mar. 6, 2003

(51) Int. Cl.[7] .............................. H02P 5/28; H02P 7/36; H02P 5/34
(52) U.S. Cl. ...................... 318/727; 318/810; 318/811; 318/787
(58) Field of Search ................................ 318/727, 787, 318/255, 138, 798, 810, 811

(56) References Cited

U.S. PATENT DOCUMENTS

| 4,459,529 A | * | 7/1984 | Johnson ........................ 318/729 |
| 4,656,571 A | * | 4/1987 | Umezu ........................... 363/37 |
| 4,939,437 A | * | 7/1990 | Farag et al. .................. 318/473 |
| 5,070,291 A | * | 12/1991 | Nakamura et al. ............. 318/77 |
| 5,317,248 A | * | 5/1994 | Utley et al. ................... 318/811 |
| 5,436,545 A | * | 7/1995 | Bahr et al. .................... 318/727 |
| 5,450,306 A | * | 9/1995 | Garces et al. .................. 363/41 |
| 5,471,127 A | * | 11/1995 | Vaughan et al. ............. 318/727 |
| 5,627,447 A | * | 5/1997 | Unsworth et al. ........... 318/138 |
| 5,814,966 A | * | 9/1998 | Williamson et al. ......... 318/787 |
| 5,994,883 A | * | 11/1999 | Liu ............................... 323/237 |
| 6,108,226 A | * | 8/2000 | Ghosh et al. ................. 323/255 |
| 6,137,258 A | * | 10/2000 | Jansen ........................... 318/802 |
| 6,236,179 B1 | * | 5/2001 | Lawler et al. ............... 318/439 |
| 6,339,309 B1 | * | 1/2002 | Bixel et al. .................. 318/727 |
| 6,525,497 B2 | * | 2/2003 | Lee et al. ..................... 318/432 |
| 2002/0145400 A1 | * | 10/2002 | Cashatt ........................ 318/727 |

* cited by examiner

Primary Examiner—Robert E. Nappi
Assistant Examiner—Patrick Miller

(57) ABSTRACT

A motor controller for a motor operated by an AC line voltage includes solid-state switches connectable between an AC line and a motor terminal for controlling application of AC line voltage to the motor. A current sensor senses motor current. A control circuit is connected to the switches and the current sensor for varying relative duration of on time and off time during each cycle of line voltage to control motor voltage. The control circuit determines on time during each cycle of line voltage and compensates sensed motor current responsive to the sensed on time.

14 Claims, 5 Drawing Sheets

SYSTEM AND METHOD FOR COMPENSATING THE READING OF NONCONTINUOUS AC SINUSOIDAL CURRENTS

BACKGROUND OF THE INVENTION

This invention relates to motor controllers and, more particularly, to a motor controller that automatically compensates sensed current to reduce the errors associated with sensing average motor current.

Solid state starter/controllers have found widespread use for controlling application of power to an AC induction motor. One type of starter/controller is a reduced voltage solid state starter (RVSS). The starter/controller, referred to hereinafter as simply a controller, uses SCRs, or triacs, for controlling application of AC line voltage to the motor. The SCRs are fired once during each half cycle of line voltage for controlling application of AC line voltage to the motor. The SCRs turn off at zero current.

A typical controller, such as for an elevator, is calibrated to read RMS currents from 5% to 450% of the controller's rating with pure sinusoidal AC waveforms. A sinusoidal current is used during calibration. As the current during calibration is sinusoidal, a constant conversion factor causes a sensed average motor current developed by a filter to match the actual RMS current flowing through current transformers. However, during reduced voltage starting, the SCRs are fired for only a portion of the cycle of line voltage. As a result, the AC current to the motor is actually non-sinusoidal during starting. Also, during overload conditions, if the current the motor draws exceeds the settings for the starting current limit, then the controller phases back the voltage to limit the current to the starting current limit setting. This also results in a non-sinusoidal current being sensed by the current sensors. As the incoming current waveform becomes more non-sinusoidal, the difference between average motor current given by the filter and the true RMS current increases. Depending on the setting for the overload devices and starting current limit, the error can be significant and cause large differences between the current the unit calculates and the actual RMS current. In overload conditions where the voltage to the motor is reduced to limit the current to the starting current value resulting in a discontinuous AC current waveform, the overload tripping times can be significantly longer when compared to a continuous AC waveform with the same RMS value.

Typical softstarter controllers do not compensate for the above error. This causes the current during start to exceed the setting for the maximum starting current. Each controller is rated for several different sized motors. The smaller the motor, the more sinusoidal the current for a particular setting. On the largest motor the controller is rated for the error which could be as large as 15–20%.

SUMMARY OF THE INVENTION

In accordance with the invention, there is provided a motor controller which compensates sensed motor current to reduce errors associated with sensing average motor current.

Broadly, there is disclosed herein a motor controller for a motor operated by an AC line voltage including solid state switch means connectable between an AC line and a motor terminal for controlling application of AC line voltage to the motor. A current sensor senses motor current. A control circuit is connected to the switch means and the current sensor for varying relative duration of on time and off time during each cycle of line voltage to control motor voltage. The control circuit includes means for determining on time during each cycle of line voltage and compensating sensed motor current responsive to the sensed on time.

It is a feature of the invention that the solid state switch means comprises a silicon controlled rectifier or a triac.

It is another feature of the invention that the determining means comprises a sensing circuit for sensing voltage between the AC line and the motor terminal.

It is another feature of the invention that the control circuit comprises a programmed microprocessor and a memory storing a table correlating on time to a compensation factor and the microprocessor modifies the sensed current based on the compensation factor. The microprocessor may be programmed to interpolate the compensation factor between stored on time values in the table.

It is another feature of the invention that the current sensor comprises a current transformer and a conditioning circuit for averaging sensed motor current.

There is disclosed in accordance with another aspect of the invention a motor controller for a motor operated by an AC line comprising solid state switch means connectable between an AC line and a motor terminal for controlling application of AC line voltage to the motor. A current sensor senses motor current. A voltage sensor senses voltage across the solid state switch means. A control circuit is connected to the switch means, the current sensor and the voltage sensor for varying relative duration of on time and off time during each cycle of line voltage to control motor voltage. The control circuit includes means for determining on time during each cycle of line voltage responsive to the voltage across the solid state switch means and compensating sensed motor current responsive to the sensed on time.

There is disclosed in accordance with yet another aspect of the invention a motor controller for a motor operated by an AC line voltage comprising solid state switch means connectable between an AC line and a motor terminal for controlling application of AC line voltage to the motor. A current sensor senses average motor current. Time sensing means determine on time of the solid state switch means during each cycle of line voltage. Current compensation means compensates sensed average motor current responsive to the sensed on time to determine RMS motor current.

Further features and advantages of the invention will be readily apparent from the specification and from the drawings.

DETAILED DESCRIPTION OF THE INVENTION

Figure 1:
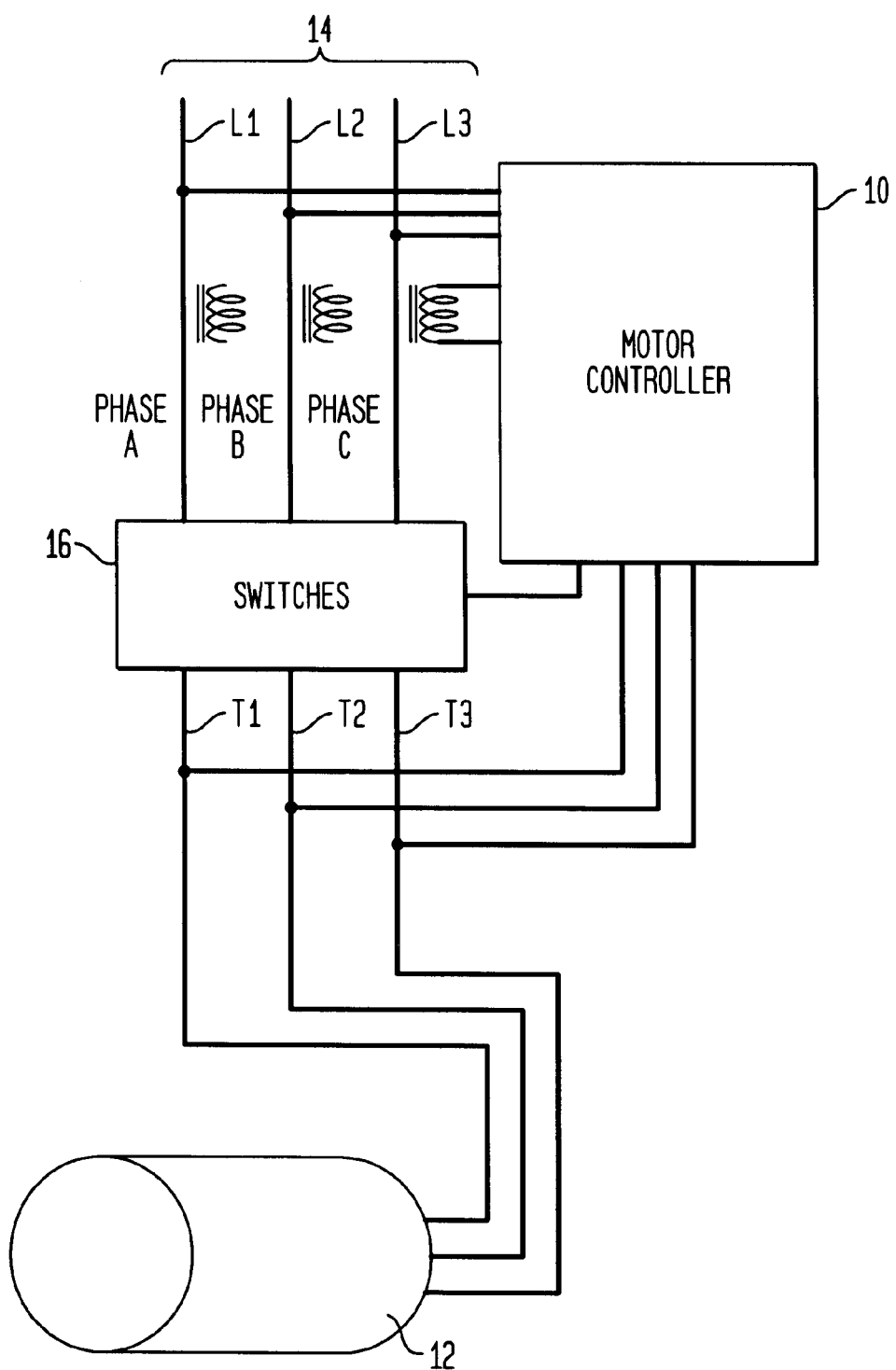
FIG. 1 is block diagram of a motor system including a motor controller according to the invention.

Referring to FIG. 1, a motor controller 10 according to the invention controls the operation of a motor 12 supplied by an AC line voltage developed by an AC power source 14. The power source 14 supplies line voltage, typically 200 to 690 volts AC, at terminals L1, L2 and L3. The motor controller 10 includes solid state switches 16 in the form of thyristors. The thyristors may be two antiparallel silicon controlled rectifiers (SCRs), or single triacs. The switches 16, one for each phase, are connected between the respected line terminals L1, L2 and L3, and respective motor terminals T1, T2 and T3. The switches 16 control application of three-phase AC line voltage 14 to the motor 12.

The invention described herein relates to compensating for sensed motor current responsive to on time of the switches 16. The controller 10 is illustrated for controlling a three-phase system. However, the invention can be used in connection with motor controllers for controlling any number of phases, as will be apparent.

A triac is, in effect, a bidirectional SCR. A triac is a gate controller semiconductor device which permits current flow when the voltage on its gate exceeds a threshold value. Once the threshold has been exceeded, then current continues to flow through the triac until the current returns to zero, at which time conduction ceases until the gate threshold voltage is again exceeded.

Figure 2:
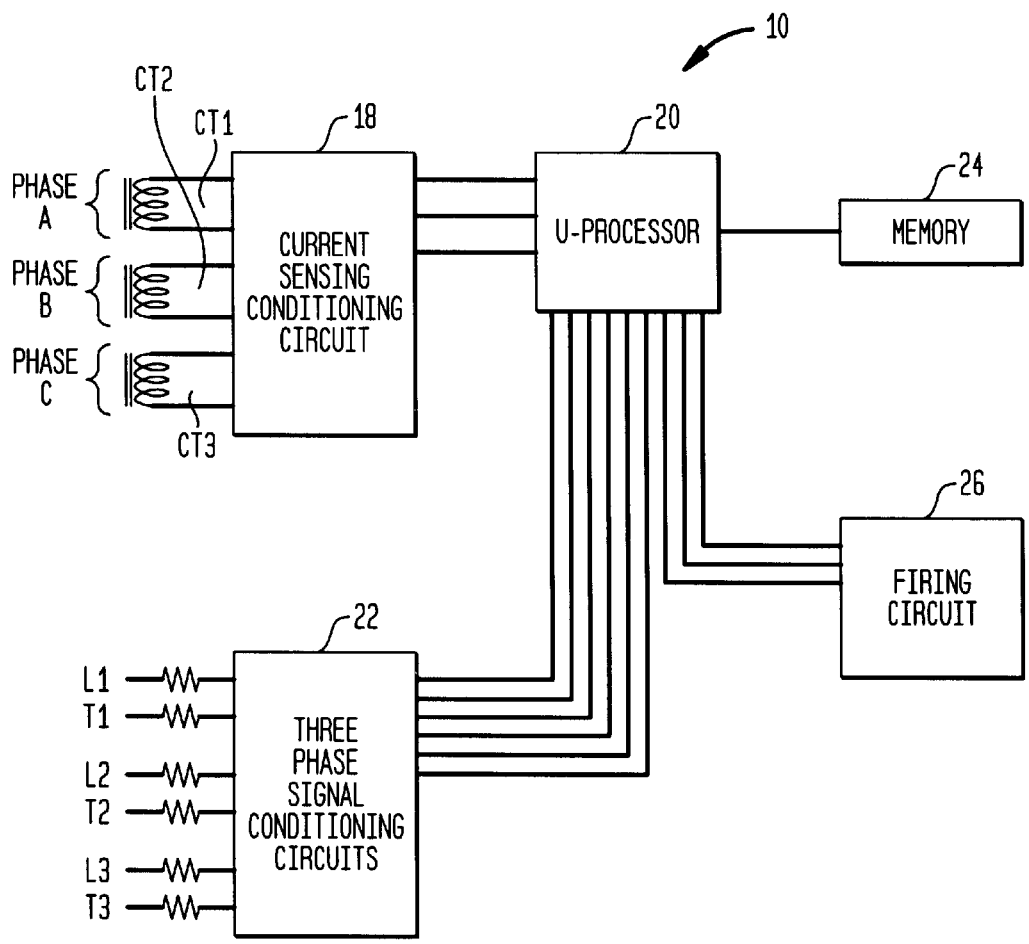
FIG. 2 is a block diagram of the motor controller of FIG. 1.

Referring to FIG. 2, the motor controller 10 is illustrated in greater detail. Motor current for each of the three phases is sensed by current transformers CT1, CT2 and CT3. The current transformers CT1–CT3 are connected to a current sensing conditioning circuit 18. The current sensing conditioning circuit 18 is in turn connected to the A/D conversion section of a microprocessor 20. A three phase signal conditioning circuit 22 is connected to the line terminals L1–L3 and the motor terminals T1–T3 and is also connected to the microprocessor 20. The microprocessor 20 is additionally connected to a memory 24 and to an SCR firing circuit 26.

The switches 16 (See FIG. 1) are controlled by the firing circuit 26. The firing circuit 26 varies relative duration of on time and off time during each cycle of line voltage to control motor voltage and/or current at a reference level. The firing circuit 26 develops the switching signals for controlling the switches 16. In the illustrated embodiment of the invention, the controller 10 comprises a solid state starter/controller which provides reduced voltage solid state starting (RVSS). The firing circuit 20 initially operates the motor 12 (See FIG. 1) at a reduced voltage and subsequently increases voltage until it reaches steady state operation. The basic switching scheme for controlling operation of the switches 16 is described in, but not limited to, U.S. Pat. No. 4,459,529, owned by the assignee of the present application, the specification of which is hereby incorporated by reference herein.

Figure 3:
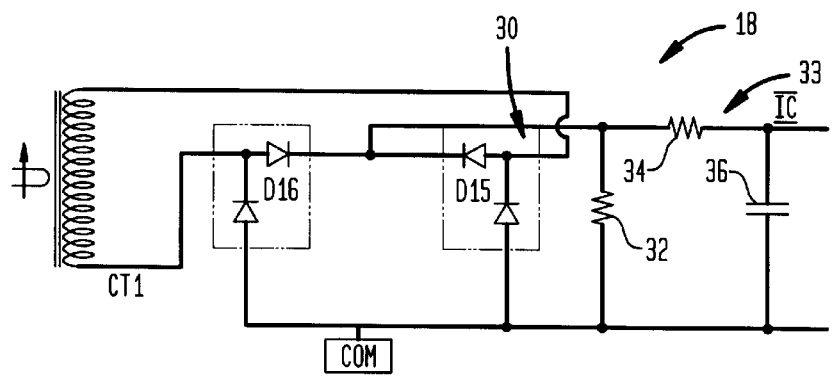
FIG. 3 is a schematic diagram of a current sensing conditioning circuit of FIG. 2.

Referring to FIG. 3, the current sensing circuit 18 for phase A is illustrated in detail. The current transformer CT1 produces a current proportional to the current in the motor leads. A diode bridge 30 rectifies the current from the current transformer CT1. The rectified current flows through a sense resistor 32. The sense resistor 32 is coupled to a filter 33 consisting of a filter resistor 34 and filter capacitor 36. The voltage across the filter capacitor 36 gives the average current in the motor lead.

The three phase signal conditioning circuits 22 (See FIG. 2) may be as generally described in U.S. Pat. No. 6,169,383, assigned to the assignee of the present application, the specification of which is hereby incorporated by reference herein. These conditioning circuits sense voltage across the switches 16 by sensing, for example, voltage from the supply terminal L1 to the motor terminal T1. These signals are used by the microprocessor 20 to determine on time of the switches 16. The on time signals are used in the microprocessor 20 to approximate and adjust the currents read by the averaging circuit.

Figure 4:
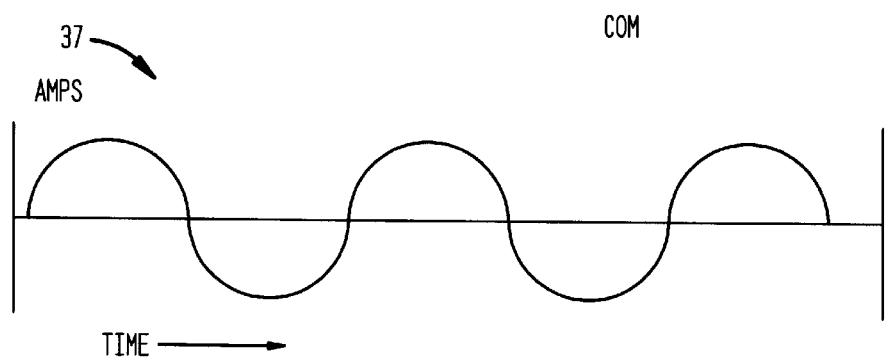
FIG. 4 is sinusoidal waveform such as might be used in calibrating the motor controller of FIG. 1.
Figure 5:
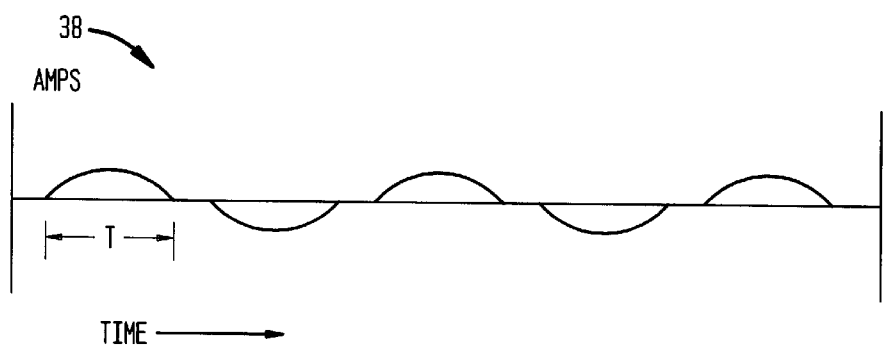
FIG. 5 is a current waveform for motor current during starting of the motor of FIG. 1.

Referring to FIG. 4, a sinusoidal waveform 37 is illustrated such as might be used in calibration of the motor controller 12. This sinusoidal waveform can also represent the AC line voltage. FIG. 5 illustrates actual motor current 38 during reduced voltage operation, such as during starting or current limiting. Particularly, the firing circuit 26 delays the start of the switch on time during each half-cycle of line voltage. The switches turn off at zero current. The on time during each half-cycle, labeled "T", is used for compensating average current to determine RMS current.

Figure 6:
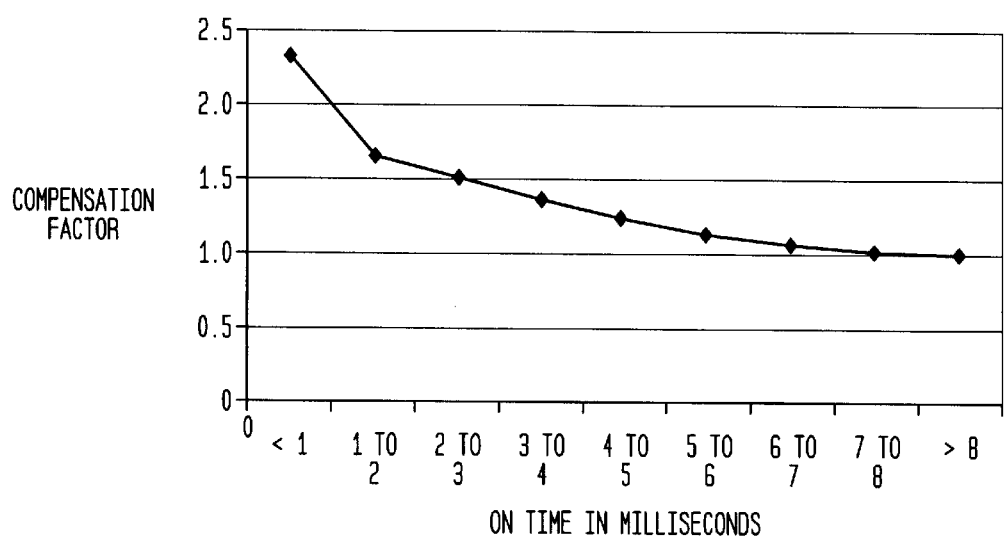
FIG. 6 is an exemplary graph of compensation factors relative to on time implemented by the motor controller of FIG. 1.

The ratio of RMS currents read by a true RMS meter to average currents read by the current sensing conditioning circuit 18 can be determined by different SCR on times. In accordance with the invention, a lookup table is constructed listing the compensation factor for on times from less than one millisecond to greater than eight milliseconds. Particularly, at 60 Hz, the maximum SCR on time is approximately 8.3 milliseconds. In accordance with the invention, the compensation factor is applied to the average current readings from the current transformers based on the determined SCR on time. FIG. 6 illustrates a graph 39 of compensation factors for an exemplary controller. As is apparent, the compensation factor begins at higher levels for shorter on-times and gradually approaches unity at about 8.3 milliseconds. The memory 24 stores a conversion factor table for the graph of FIG. 6. The table may correlate discrete on time values to compensation factors.

Figure 7:
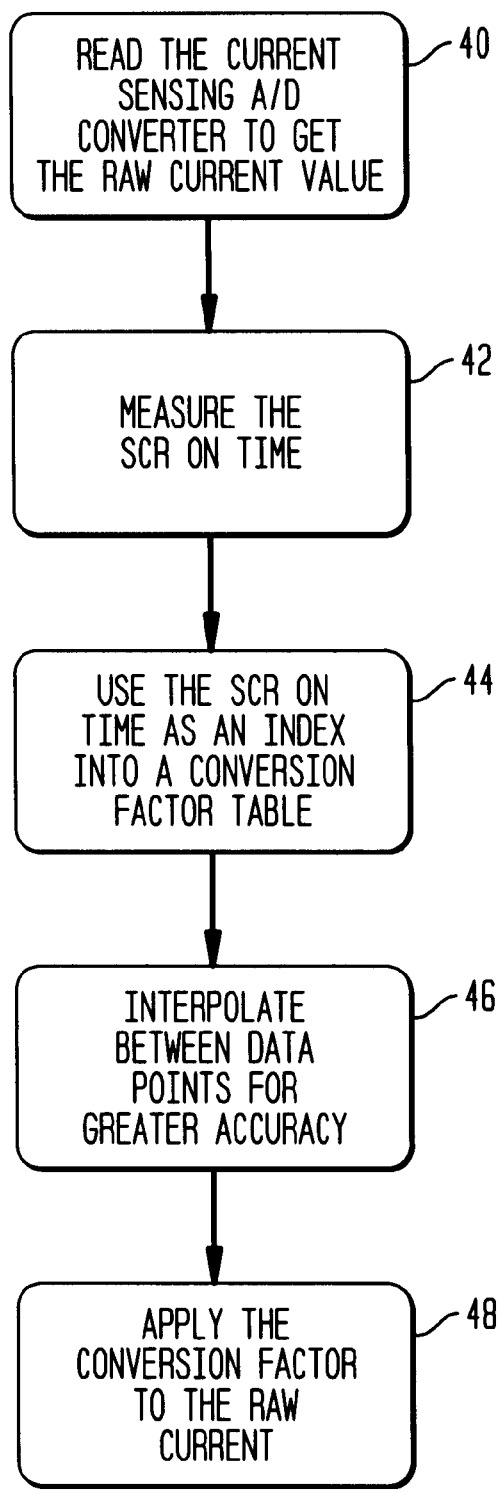
FIG. 7 is a program implemented in the microprocessor of FIG. 2 for compensating sensed motor current responsive to sensed on time in accordance with the invention.

Referring to FIG. 7, a flow diagram illustrates a program stored in the memory 24 and implemented by the microprocessor 20 of FIG. 2 for adjusting the average current by the compensation factor to reduce the error associated with sensing average current. The program begins at a block 40. An analog to digital (A/D) converter (not shown) may be used between the current sensing conditioning circuit 18, and the microprocessor 22. At the block 40, the average current from the A/D converter is read to obtain a raw current value. At a block 42 the SCR on time for any phase is measured using the signals received by the three-phase signal conditioning circuits 22. The SCR on time is used as an index into a conversion factor table at a block 44. As discussed above, the table may store discrete points from the graph of FIG. 6. If the on time does not fall on one of the discrete points, then the program interpolates between data points for greater accuracy at a block 46. The determined compensation factor is then applied to the raw current at a block 48. The result represents actual RMS current in the motor windings. This RMS current is then used by the microprocessor 20 for operating the firing circuit 26 for starting and current limiting and the like.

Thus, in accordance with the invention, the compensation factor is adjusted based on switch on time to provide more accurate current reading for reducing error associated with sensing average current.

It can therefore be appreciated that a new and novel system and method for automatically compensating sensed current to reduce the errors associated with sensing average motor current has been described. It will be appreciated by those skilled in the art that, given this teaching, numerous alternatives and equivalents will be seen to exist which incorporate the invention disclosed herein. As a result, the invention is not to be limited by the foregoing exemplary embodiments, but only by the following claims.

We claim:

1. A motor controller for a motor operated by an AC line voltage comprising:

solid state switch means connectable between an AC line and a motor terminal for controlling application of AC line voltage to the motor;

a current sensor for sensing motor current; and a control circuit connected to the switch means and the current sensor for varying relative duration of on time and off time during each cycle of line voltage to control motor voltage, the control circuit including, means for determining on time during each cycle of line voltage and compensating sensed motor current responsive to the sensed on time, and a programmed microprocessor and a memory storing a table correlating on time to a compensation factor, and the microprocessor modifying the sensed motor current based on the compensation factor.

2. The motor controller of claim 1 wherein the solid state switch means comprises a silicon controlled rectifier.

3. The motor controller of claim 1 wherein the solid state switch means comprises a triac.

4. The motor controller of claim 1 wherein the determining means comprises a sensing circuit for sensing voltage between the AC line and the motor terminal.

5. The motor controller of claim 1 wherein the microprocessor is programmed to interpolate the compensation factor between stored on time values in the table.

6. The motor controller of claim 1 wherein the current sensor comprises a current transformer and a conditioning circuit for averaging sensed motor current.

7. A motor controller for a motor operated by an AC line voltage comprising:

solid state switch means connectable between an AC line and a motor terminal for controlling application of AC line voltage to the motor;

a current sensor for sensing motor current;

a voltage sensor for sensing voltage across the solid state switch means; and a control circuit connected to the switch means, the current sensor and the voltage sensor for varying relative duration of on time and off time during each cycle of line voltage to control motor voltage, the control circuit including, means for determining on time during each cycle of line voltage responsive to the voltage across the solid state switch means and compensating sensed motor current responsive to the sensed on time, and a programmed microprocessor and a memory storing a table correlating on time to a compensation factor and the microprocessor modifies the sensed motor current based on the compensation factor.

8. The motor controller of claim 7 wherein the solid state switch means comprises a silicon controlled rectifier.

9. The motor controller of claim 7 wherein the solid state switch means comprises a triac.

10. The motor controller of claim 1 wherein the microprocessor is programmed to interpolate the compensation factor between stored on time values in the table.

11. The motor controller of claim 7 wherein the current sensor comprises a current transformer and a conditioning circuit for averaging sensed motor current.

12. A motor controller for a motor operated by an AC line voltage comprising:

solid state switch means connectable between an AC line and a motor terminal for controlling application of AC line voltage to the motor;

a current sensor for sensing average motor current;

time sensing means for determining on time of the solid state switch means during each cycle of line voltage; and current compensation means for compensating sensed average motor current responsive to the sensed on time to determine RMS motor current, wherein the current compensation means comprises a programmed microprocessor and a memory storing a table correlating on time to a compensation factor and the microprocessor modifying the sensed average motor current based on the compensation factor.

13. The motor controller of claim 12 wherein the time sensing means comprises a voltage sensor for sensing voltage across the solid state switch means.

14. The motor controller of claim 13 further comprising a control circuit connected to the switch means, the current sensor and the voltage sensor for varying relative duration of on time and off time during each cycle of line voltage to control motor voltage.

* * * * *